United States Patent Office 2,911,448
Patented Nov. 3, 1959

2,911,448

CYCLIC TETRADECACHLORO COMPOUND AND METHOD OF MAKING

Earl T. McBee, West Lafayette, Ind., James D. Idol, Jr., Cleveland, Ohio, and Carleton W. Roberts, Lafayette, Ind., assignors to Purdue Research Foundation, Lafayette, Ind., a corporation of Indiana No Drawing. Application October 17, 1955
Serial No. 541,084

2 Claims. (Cl. 260—648)

The present invention is concerned with a novel and useful composition of matter having the empirical formula $C_{10}Cl_{14}$, and two novel processes for its preparation. The composition is further identified as being obtained in the form of colorless, needle-like crystals or white prisms melting at 166–168 degrees centigrade (depending upon its method of preparation) and having an absorption maximum at 224 millimicrons (log $\epsilon = 4.20$) in the ultraviolet spectra obtained in ethanol.

The composition can be made by a process of exhaustive chlorination of bicyclopentyl under the accelerating influence of light or heat. The process is preferably conducted by introducing chlorine, preferably in gaseous form, into bicyclopentyl which has been cooled to ice temperature and then increasing the temperature stepwise to 175 degrees centigrade as the reaction becomes sluggish as evidenced by the green coloration of the reaction mixture. The reaction mixture is strongly irradiated with a mercury lamp after the reaction has become sluggish at 25 degrees centigrade. Crystals of $C_{10}Cl_{14}$ separate when the mixture is cooled to room temperature. The crystals thus obtained are purified by recrystallization from a solvent such as petroleum ether.

The composition can also be prepared by the chlorination of 1,2,3,3a,4,5,6,7,7a,8-decachloro-3a,4,7,7a-tetrahydro-4,7-methanoindene. This process is preferably conducted by sealing approximately equal amounts by weight of 1,2,3,3a,4,5,6,7,7a,8-decachloro-3a,4,7,7a-tetrahydro-4,7-methanoindene and chlorine in a Carius tube which is then heated to about 200 degrees centigrade for about 12 hours. The tube is then cooled and the contents frozen, after which the tube is opened and the excess chlorine allowed to evaporate. The residue is then purified by extraction and recrystallization from organic solvents.

The following description illustrates the manner and processes of making the said composition and represents the best mode of conducting the processes contemplated by us.

PREPARATION I—BICYCLOPENTYL

One gram mole of sodium sand was prepared by rapid agitation of molten metallic sodium in hot xylene in a one-liter three-necked flask equipped with a mercury-sealed Hershberg stirrer and a reflux condenser. The xylene was removed with a filter stick; the sodium sand was washed six times with anhydrous ether and then covered with 300 milliliters of anhydrous ether. Cyclopentyl bromide (149 grams, 1.0 mole) dissolved in 100 milliliters of ether was added dropwise at a substantially uniform rate over a period of two hours. After stirring the mixture for an additional two hours, 10 milliliters of ethanol was added to take up any unreacted sodium. The reaction mixture was poured, with caution, into 500 milliliters of water; the organic layer was decanted and dried over Drierite. The dried ether solution was rectified in a metal helices-packed column. There was thus obtained 37 grams (53 percent of the theoretical yield) of bicyclopentyl, boiling at 107–109 degrees centigrade at a pressure of 50 millimeters and having a refractive index $n_D^{20}$ of 1.4645.

Example 1.—Method A.—Preparation of $C_{10}Cl_{14}$

Bicyclopentyl (0.36 mole, 50 grams) was placed in a vertical Pyrex tube, 12 inches by 1.25 inches and the tube and contents chilled to zero degrees centigrade. Chlorine was passed into the liquid first at zero degrees centigrade for about 10 hours, then at 25 degrees centigrade until the latter assumed a green color indicating that the rate of hydrogen substitution was becoming sluggish (about 10 hours). The ice bath was removed and the tube strongly irradiated with a 100 watt mercury lamp, addition of chlorine being continued. When hydrogen chloride was no longer detectable in the exhaust gases, the temperature was raised to 75 degrees centigrade for 20 hours and ultimately to 175 degrees centigrade during the next 40 hours. The dark-brown liquid solidified on cooling to room temperature to a mass of crystals which were recrystallized twice from petroleum ether (boiling at 60–70 degrees centigrade) to give 149 grams (74 percent of the theoretical yield) of colorless needles melting at 166–167 degrees centigrade.

*Analysis.*—Calculated for $C_{10}Cl_{14}$: C, 19.51; Cl, 80.49. Found: C, 19.54; Cl, 80.08.

Example 2.—Method B.—Preparation of $C_{10}Cl_{14}$

Ten grams (0.021 mole) of 1,2,3,3a,4,5,6,7,7a,8-decachloro-3a,4,7,7a-tetrahydro-4,7-methanoindene and 10 grams (0.14 mole) of chlorine were sealed in a Carius tube which was then heated to 200 degrees centigrade for 12 hours in an electric furnace. After cooling and freezing the contents with liquid nitrogen, the tube was opened and the excess chlorine was allowed to evaporate. The residue was extracted with petroleum ether (boiling at 35–37 degrees centigrade) and the resulting solution was decolorized with Norite (activated charcoal) and chilled in an ice bath giving 8 grams (62 percent of the theoretical yield) of the crude compound $C_{10}Cl_{14}$. Recrystallization from a mixture of benzene and methanol gave white prisms, melting at 167–168 degrees centigrade. This product gave a non-depressed mixed melting point with product from Method A.

*Analysis.*—Calculated for $C_{10}Cl_{14}$: C, 19.51; Cl, 80.49. Found: C, 19.41; Cl, 79.91.

The infrared spectrum of the product from this experiment (measured in chloroform) was identical with that of the product from Method A (also measured in chloroform).

The product of the present invention has insecticidal properties and also has utility as starting material for the preparation of well-known useful compounds.

REACTION I.—PYROLYSIS OF $C_{10}Cl_{14}$ TO FORM HEXACHLOROBENZENE

Ten grams (0.016 mole) of $C_{10}Cl_{14}$ was sealed in a Carius tube at two millimeters pressure and heated to a temperature of 400 degrees centigrade ±10 degrees centigrade for ten hours. After cooling, the tube was opened and the products were extracted with chloroform and recrystallized from hot petroleum ether (boiling point, 60–70 degrees centigrade). A total of six grams of hexachlorobenzene was isolated as the reaction product. It melted at 224–225 degrees centigrade and gave an undepressed melting point with a sample of authentic hexachlorobenzene.

REACTION II.—PYROLYSIS OF $C_{10}Cl_{14}$ TO FORM HEXACHLOROCYCLOPENTADIENE

The composition $C_{10}Cl_{14}$ (15 grams, 0.024 mole) was placed in a Pyrex tube 1.5 x 10 centimeters. The tube was provided with a side arm which was connected to a cooled receiver. With the system partially evacuated (25 millimeters), the temperature of the pyrolysis tube and its contents was raised gradually by use of a Wood's metal bath until a liquid product was collected in the receiver. This temperature (about 300 degrees centigrade) was maintained for two hours. Distillation of the liquid product gave 6.7 grams (77 percent of the theoretical yield) of hexachlorocyclopentadiene, boiling at 83–86 degrees centigrade at two millimeters pressure and having a refractive index $n_D^{20}$ of 1.5657.

It is to be understood that the invention is not to be limited to the exact details of operation shown and described as obvious modifications and equivalents will be apparent to one skilled in the art, and the invention is therefore to be limited only by the scope of the appended claims.

We claim:

1. A composition of matter having the empirical formula $C_{10}Cl_{14}$ and melting at 166–168 degrees centigrade.

2. The process which includes: introducing chlorine into 1,2,3,3a,4,5,6,7,7a,8-decachloro-3a,4,7,7a-tetrahydro-4,7-methanoindene, heating the reaction mixture to about 200 degrees centigrade for about 12 hours, and separating from the reaction mixture a composition having the empirical formula $C_{10}Cl_{14}$ melting at 167–168 degrees centigrade.

References Cited in the file of this patent

UNITED STATES PATENTS

| | | |
|---|---|---|
| 2,519,190 | Hyman | Aug. 15, 1950 |
| 2,671,043 | Gilbert | Mar. 2, 1954 |
| 2,724,730 | Johnson | Nov. 22, 1955 |